E. T. RILEY.
GRAIN DROPPER.
APPLICATION FILED OCT. 12, 1911.

1,037,319.

Patented Sept. 3, 1912.
2 SHEETS—SHEET 1.

Witnesses
Edwin F. McKee
Mary C. Sheridan

Inventor
Enoch Tillman Riley

By Geo. W. Suls.
Attorney

E. T. RILEY.
GRAIN DROPPER.
APPLICATION FILED OCT. 12, 1911.
1,037,319.
Patented Sept. 3, 1912.
2 SHEETS—SHEET 2.
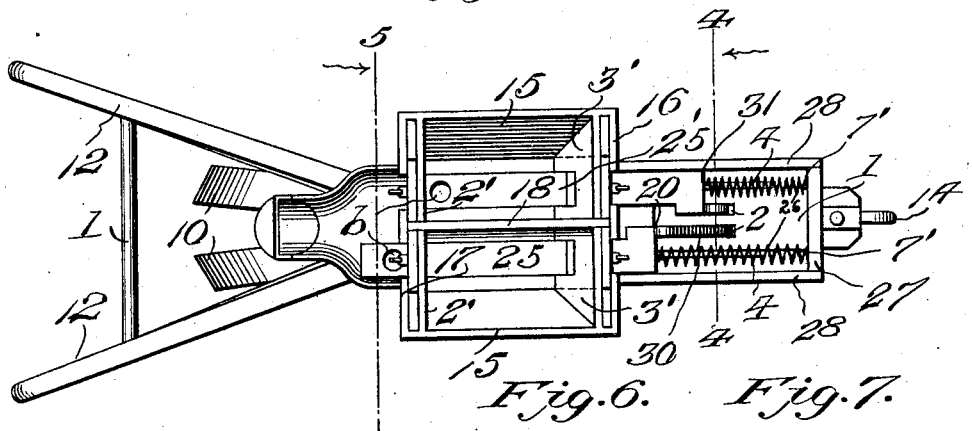
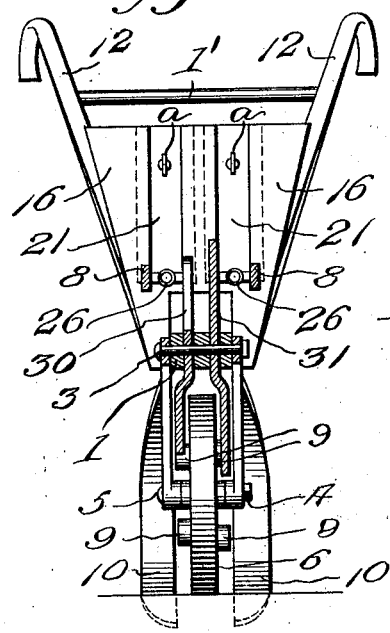
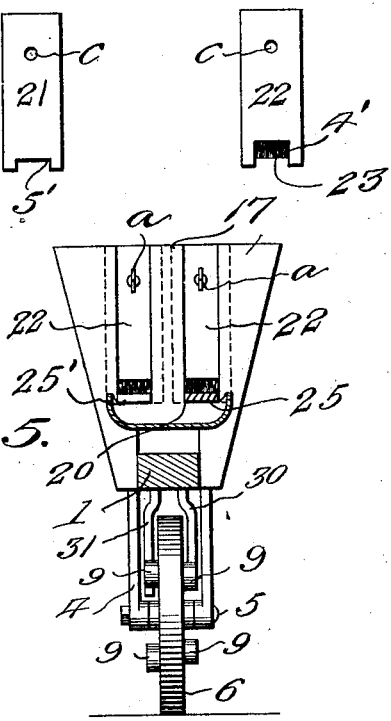
Inventor
Enoch Tillman Riley
Witnesses
Edwin G. McKee
Mary C. Sheridan
By Geo. W. Sule.
Attorney

UNITED STATES PATENT OFFICE.

ENOCH TILLMAN RILEY, OF OZARK, ALABAMA.

GRAIN-DROPPER.

1,037,319.  Specification of Letters Patent.  Patented Sept. 3, 1912.

Application filed October 12, 1911. Serial No. 654,301.

*To all whom it may concern:*

Be it known that I, ENOCH TILLMAN RILEY, a citizen of the United States, and a resident of Ozark, in the county of Dale and State of Alabama, have invented certain new and useful Improvements in Grain-Droppers, of which the following is a specification, reference being had to the accompanying drawings.

This invention has relation to an improved agricultural implement used in planting seeds; and the object of my invention is to provide a walking duplex grain dropper, of a simple and inexpensive nature and of a durable construction which shall be capable of being conveniently drawn over a prepared field, the dropper being so constructed that two kinds of seed, as corn and velvet beans for instance, may be alternately deposited in hills equal distances apart, and my invention includes certain other novel details of construction as will be described more fully hereinafter and finally pointed out in the claims.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

Figure 1:
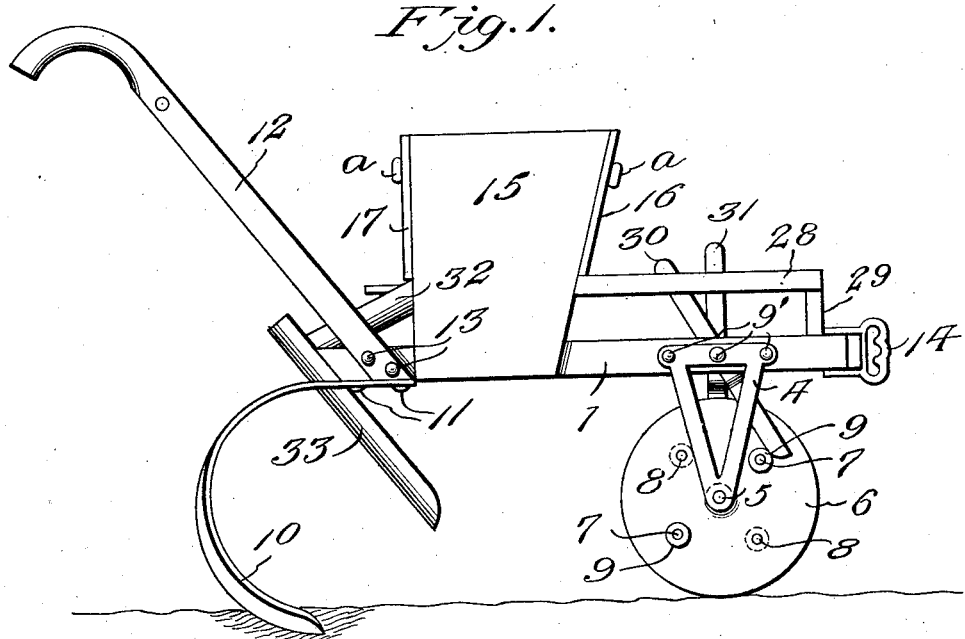
Figure 2:
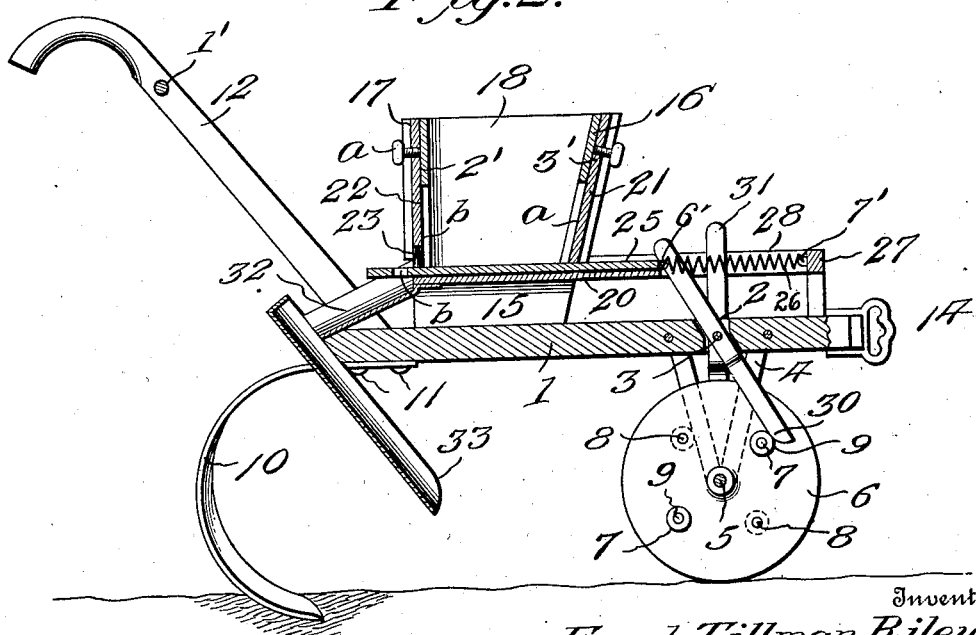

In the accompanying drawings forming a part of this specification and in which like numerals of reference indicate similar parts in the several views: Figure 1, is a side elevational view of a duplex grain dropper embodying my invention. Fig. 2, is a longitudinal sectional view of Fig. 1. Fig. 3, is a top view. Fig. 4, is a section on line 4, 4, of Fig. 3, looking in the direction of the arrow. Fig. 5, is a section on line 5, 5, of Fig. 3, looking in the direction of the arrow. Fig. 6, is a detached detail of one of the front gates. Fig. 7, is a detached detail of one of the rear brush carrying gates.

In my present invention I provide a simply constructed, positively operating grain and seed dropper which, while in use, is guided by an operator walking behind the implement, and the device is arranged to alternately drop two kinds of grains.

In many sections of the United States where much corn is planted it is customary to plant velvet beans, or field peas or ground peas, between the corn hills, and my present invention is especially constructed with a view of providing the small farmers with a light, inexpensive seed dropper by means of which two kinds of seeds may be deposited in alternating hills.

In carrying out the aim of my invention I employ a beam 1, which near its forward end has two slots 2, shown in Fig. 3, through which a pivot bolt 3, extends. Upon opposite sides near the forward end, I secure the brackets 4, giving support to a stub shaft 5, as shown in Figs. 1 and 5, revolubly carrying the wheel 6. Upon one side the wheel has the projecting studs 7, 7, and upon the opposite sides the studs 8, 8, each stud in turn revolubly holding a roller 9, as clearly shown in Fig. 4.

Extending downwardly from the rear end of the beam 1, are the two curved covering blades 10, which are held in divergent spaced relation, as disclosed in Fig. 3, these blades being secured by means of the bolts 11. Extending obliquely upwardly from the rear end of the above the blades 10, are the two guiding handles 12, which are braced above by means of the transverse bar 1'. At its forward end the beam is provided with an ordinary clevis 14.

Extending obliquely upward from the beam 1, are two panels 15, forming the sides of a hopper which includes the slotted front panel 16, shown in Fig. 4, and the slotted rear panel 17, shown in Fig. 5. The hopper is divided into two compartments by means of the partition 18. By means of these inner members 2' and 3', a narrow space is formed in conjunction with the outer panels within which are slidably held the front gates 21, and the rear gates 22. Each gate is provided with a set screw *a*, as clearly shown in Fig. 2, so that the gates can be adjustably secured in position. At its lower end each gate 22, held to the rear panel 17, is provided with a recess 4', and held within each recess is a brush 23.

The bottom 20, of the hopper, as shown in Fig. 2, extends a suitable distance beyond the forward edge of the hopper and serves as a stop to the push bars used in connection with my invention.

Slidably held within the recesses 4', of the rear panels and the recesses 5' within the front panels, are the apertured feed plates 25 and 25', these feed plates being similar in construction, each at its rear end being provided with a seed opening b, as shown in Figs. 2 and 3. These seed plates reciprocate upon the bottom 20. At its forward end each feed plate is provided with an ear 6', as shown in Fig. 2, each ear giving support to a spring 26, these springs 26, at their forward ends being secured to the ears 7', extending from the frame bar 27. Extending from the forward frame bar 27, are the two side frame members 28, shown in Figs. 2 and 3, which in a measure act as guides for the reciprocating feed plates 25 and 25'. The members 28, are suitably secured to the upper panels at the rear ends, while the forward member 27 is supported by means of the post 29, as shown in Figs. 1 and 2. Pivotally held upon the bolt 3, as shown in Fig. 2, and within the slots 2, are two similar push bars 30 and 31, the first mentioned being arranged to contact with the feed plate 25, as shown in Fig. 3, while the opposite push bar 31, is arranged to contact with the feed plate 25'. By means of the springs 26, these feed plates are in normal engagement with the push bars 30 and 31.

Secured to the rear part of the hopper is a rearwardly and downwardly extending spout 32, which empties into a forwardly inclined spout 33, as shown in Fig. 2, the instrumentalities being so arranged that the feed openings b, will empty into the upper spout 32, from which the seed or corn will gravitate down the spout 33, and be properly deposited within the ground. The set screws a, held within the panels 21 and 22, work within suitable thread openings c, near the upper ends of the panels as shown in Figs. 6 and 7. The brackets 4, are held to the beam 1, by means of the bolts 9'.

When the instrumentalities have been properly constructed, the operation of my device is as follows: The two kinds of seed to be planted are placed within separate hoppers. Now it should be remembered that the feed plates are of various thicknesses to accommodate the different kinds of seeds. In going to the field the springs 26, are released so that there will be no loss of seed. When it is desired to use the machine the springs have their forward ends connected to the ears 7'. Now as the dropper is moved over the field, the wheel 6 rotates so that first one push bar is actuated and then the other, resulting in first one kind of grain being deposited and on the next operation of a push bar, a second kind of grain is dropped. The brushes 23, sweep back any seed that may have lodged upon the top of the feed plates. By increasing or diminishing the number of studs 7 and 8, I regulate the distance between hills.

A grain dropper constructed according with my invention is simple and inexpensive in construction and both durable and efficient in operation, and the adjustment of the feed plates within the bottom of the hopper can be accomplished with ease, accuracy and despatch.

Having thus described my said invention, what I claim as new and desire to secure by United States Letters Patent is:—

1. A grain dropper having in combination, a beam, two push bars pivotally held to said beam, a hopper divided into two compartments having its rear and forward ends opened, a gate closing each open end of said hoppers, a brush at the lower end of each rear gate, means to adjustably hold said gates, a feed plate slidably held upon the bottom of each hopper compartment and extending through the forward and rear ends thereof each feed plate having a seed opening at its rear end, a spring secured to each feed plate each plate being held in spring pressed engagement with a push bar, a spout extending from the rear end of said hopper said seed openings being arranged to empty into said spout, brackets secured to the forward end of said beam, a wheel journaled in said brackets and positioned between said push bars, studs carried upon opposite sides of said wheel to alternately engage said push bars, and two curved divergently held covering blades secured at opposite sides to the rear end of said beam.

2. A grain dropper having in combination, a beam, two push bars pivotally held to said beam, a hopper divided into two compartments having its rear and forward ends opened, a gate closing each open end of said hoppers, a brush at the lower end of each rear gate, means to adjustably hold said gates, a feed plate slidably held upon the bottom of each hopper compartment and extending through the forward and rear ends thereof each feed plate having a seed opening at its rear end, a spring secured to each feed plate each plate being held in spring pressed engagement with a push bar, a spout extending from the rear end of said hopper said seed openings being arranged to empty into said spout, brackets secured to the forward end of said beam, a wheel journaled to said brackets and positioned between said push bars, studs carried upon opposite sides of said wheel to alternately engage said push bars, and guiding handles secured to the rear end of said beam.

In testimony whereof I affix my signature, in presence of two witnesses.

ENOCH TILLMAN RILEY.

Witnesses:
L. B. MARTIN,
OSCAR AKINS.

---

Copies of this patent may be obtained for five cents each, by addressing the "Commissioner of Patents, Washington, D. C."